(12) United States Patent (10) Patent No.: US 9,085,324 B2
Kojima (45) Date of Patent: Jul. 21, 2015

(54) FRONT PILLAR STRUCTURE FOR VEHICLE

(71) Applicant: Fuji Jukogyo Kabushiki Kaisha, Tokyo (JP)

(72) Inventor: Naoki Kojima, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/027,420

(22) Filed: Sep. 16, 2013

(65) Prior Publication Data

US 2014/0084631 A1    Mar. 27, 2014

(30) Foreign Application Priority Data

Sep. 27, 2012  (JP) ................................. 2012-215076

(51) Int. Cl.
  *B62D 25/04*  (2006.01)
  *B60R 13/04*  (2006.01)
(52) U.S. Cl.
  CPC ............... *B62D 25/04* (2013.01); *B60R 13/04* (2013.01)
(58) Field of Classification Search
  CPC .................................. B62D 25/04; B60R 13/04
  USPC ........ 296/208, 180.1, 203.01–203, 4, 193.06, 296/193.05, 213, 1.11; 454/123, 124, 141, 454/147, 164, 165, 158
  See application file for complete search history.

(56) References Cited

U.S. PATENT DOCUMENTS 4,538,851 A * 9/1985 Taylor ......................... 296/180.1
5,162,019 A * 11/1992 Widmaier et al. ............ 454/147

FOREIGN PATENT DOCUMENTS

| JP | S52-16134 | 2/1977 |
| JP | S57-200480 | 12/1982 |
| JP | S58-160879 | 10/1983 |
| JP | S59-67375 | 5/1984 |
| JP | S59-179154 | 11/1984 |
| JP | S62-65370 | 4/1987 |
| JP | S63-162685 | 10/1988 |
| JP | 2011-5939 A | 1/2011 |

* cited by examiner

*Primary Examiner* — Dennis H Pedder
(74) *Attorney, Agent, or Firm* — Smith, Gambrell & Russell, LLP

(57) ABSTRACT

A front pillar structure for a vehicle includes: a windshield; a front door; a front pillar located between the windshield and the front door; a pillar outer cover disposed on an outer surface of the front pillar; and a side mirror. A flow passage for flowing air is formed between the pillar outer cover and the front pillar. An inlet port and an air outlet port are respectively formed at the front and rear of the flow passage. The flow passage is provided with ribs to separate air and rain water from each other. The air outlet port is open toward the rear of the vehicle at a position slightly higher than the upper edge of the door mirror. The air outlet port has a longitudinal dimension approximately one-fifth of the longitudinal dimension of the inlet port.

10 Claims, 5 Drawing Sheets

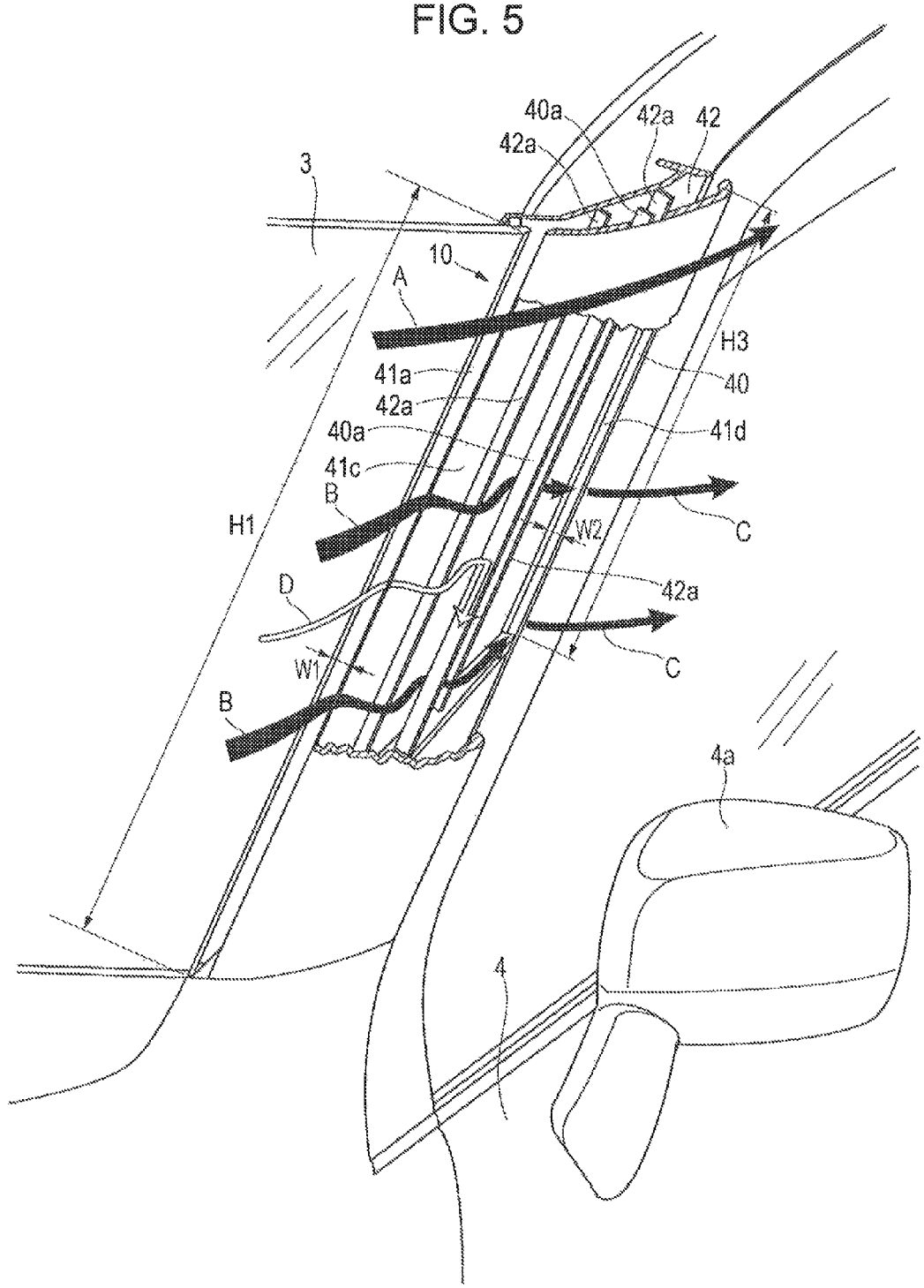

FRONT PILLAR STRUCTURE FOR VEHICLE

CROSS-REFERENCE TO RELATED APPLICATIONS

The present application claims priority from Japanese Patent Application No. 2012-215076 filed on Sep. 27, 2012, the entire contents of which are hereby incorporated by reference.

BACKGROUND

1. Technical Field

The present invention relates to front pillar structures located on both widthwise sides of the windshield of a vehicle and configured to support the front of a roof panel.

2. Related Art

A conventional front pillar structure for a vehicle includes a windshield, disposed on the front side of a vehicle, front doors disposed on both widthwise sides of the vehicle body, a front pillar disposed between the windshield and each front door, and a pillar outer cover disposed on the outer surface of each front pillar. A step is formed between the windshield and each pillar outer cover (for instance, see Japanese Unexamined Patent Application Publication No. 2011-5939). With this front pillar structure, when a vehicle is running in the rain, rain water which flows over the front surface of the windshield outwardly in the width direction is caused to flow along the step between the windshield and each pillar outer cover, whereby the flow of rain water to the glass of each front door is regulated, and the field of view in the lateral direction is secured when the vehicle is running in the rain.

With the above-mentioned front pillar structure, the flow of air becomes turbulent due to the step between the windshield and each pillar outer cover when the vehicle is running, and thus air resistance may increase. In addition, when the vehicle is running, a negative pressure may occur behind the front pillar, and thus aerodynamic performance may be reduced. In addition, when snow adhering to the windshield is wiped away by a wiper when the vehicle is running of a vehicle in the snowfall, the snow wiped away by the wiper is deposited on the step between the windshield and each pillar outer cover, and thus necessary field of view may not be assured. Furthermore, with the front pillar structure, the step between the windshield and each pillar outer cover may decrease the appearance of the vehicle design.

SUMMARY OF THE INVENTION

The present invention aims to provide a front pillar structure for a vehicle, the structure being capable of reducing the air resistance, improving the aerodynamic performance during running of a vehicle, regulating the flow of rain water to the glass of each front door in the rain, increasing snow removal performance in the snowfall, and enhancing the appearance of the vehicle.

A first aspect of the present invention provides a front pillar structure for a vehicle, the structure Including a windshield disposed on the front of a vehicle body; a front door disposed on each of both widthwise sides of the vehicle body; a front pillar located between the windshield and the front door; a pillar outer cover disposed on an outer surface of the front pillar; and a side mirror disposed on a front side of each front door in the front-rear direction; an inlet port disposed between the front pillar and the pillar outer cover; a gas-liquid separator disposed between the front pillar and the pillar outer cover; and an outlet port are disposed between the front pillar and the pillar outer cover. The inlet port is disposed on a front side in the front-rear direction and allows air to flow through the inlet port. The gas-liquid separator separates water from air, the water flowing into the inlet port with the air, guides the air after the separation to the outlet port, and introduces the water after the separation to a lower side in a vertical direction of the vehicle. The outlet port is disposed on a rear side in the front-rear direction at a position in a predetermined range from a height of an upper edge of the side mirror and discharges air through the outlet port.

A second aspect of the present invention provides a front pillar structure for a vehicle, the structure including: a windshield disposed on the front of a vehicle body; a front door disposed on each of both widthwise sides of the vehicle body; a front pillar located between the windshield and the front door; and a pillar outer cover disposed on an outer surface of the front pillar. An inlet port, a gas-liquid separator, and an outlet port are provided between the front pillar and the pillar outer cover. The inlet port is disposed on a front side in the front-rear direction and allows air to flow through the inlet port. The gas-liquid separator separates water from air, the water flowing into the inlet port with the air, guides the air after the separation, to the outlet port, and introduces the water after the separation to a lower side in a vertical direction of the vehicle. The outlet port is disposed on a rear side in the front-rear direction in an upper vicinity of the front pillar and discharges air through the outlet port.

A third aspect of the present invention provides a front pillar structure for a vehicle, the structure including a windshield disposed on a front side of a vehicle body; a front door provided on each of both widthwise sides of the vehicle body; a front pillar located between the windshield and the front door; and a pillar outer cover disposed on an outer surface of the front pillar. An inlet port, a gas-liquid separator, and an outlet port are provided between the front pillar and the pillar outer cover. The inlet port is disposed on a front side in the front-rear direction and allows air to flow through the inlet port. The gas-liquid separator separates water from air, the water flowing into the inlet port with the air, guides the air after the separation to the outlet port, and introduces the water after the separation to a lower side in a vertical direction of the vehicle. The outlet port is disposed on a rear side in the front-rear direction at a position in a vicinity of a location where a turbulent airflow is generated during running of the vehicle and discharges air through the outlet port.

BRIEF DESCRIPTION OF THE DRAWINGS

FIG. 5 is an internal perspective view of a front pillar according to another example.

DETAILED DESCRIPTION

FIGS. 1 to 4 illustrate an example of the present invention.

Figure 1:
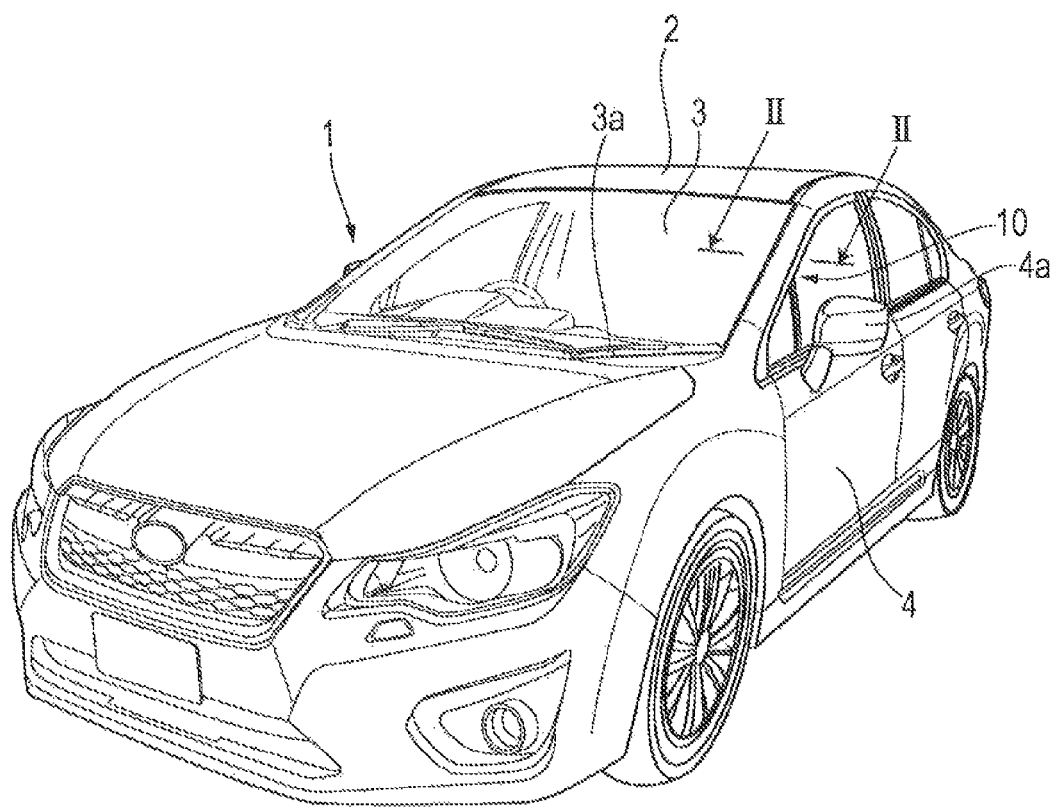
FIG. 1 is a perspective view of a vehicle according to an example of the present invention.

As illustrated in FIG. 1, a vehicle 1 having the front pillar structure according to this example includes a roof panel 2 provided at its upper side, a windshield 3 provided at its front side, front doors 4 disposed on its both widthwise sides, and a front pillar part 10 disposed between the windshield 3 and each of the front doors 4. The bottom of the front surface of the windshield 3 is provided with a wiper 3a to wipe away rain water and snow adhering to the windshield 3. The front door 4 is provided with a door mirror 4a in the vicinity of the lower end of the front pillar part 10.

Figure 2:
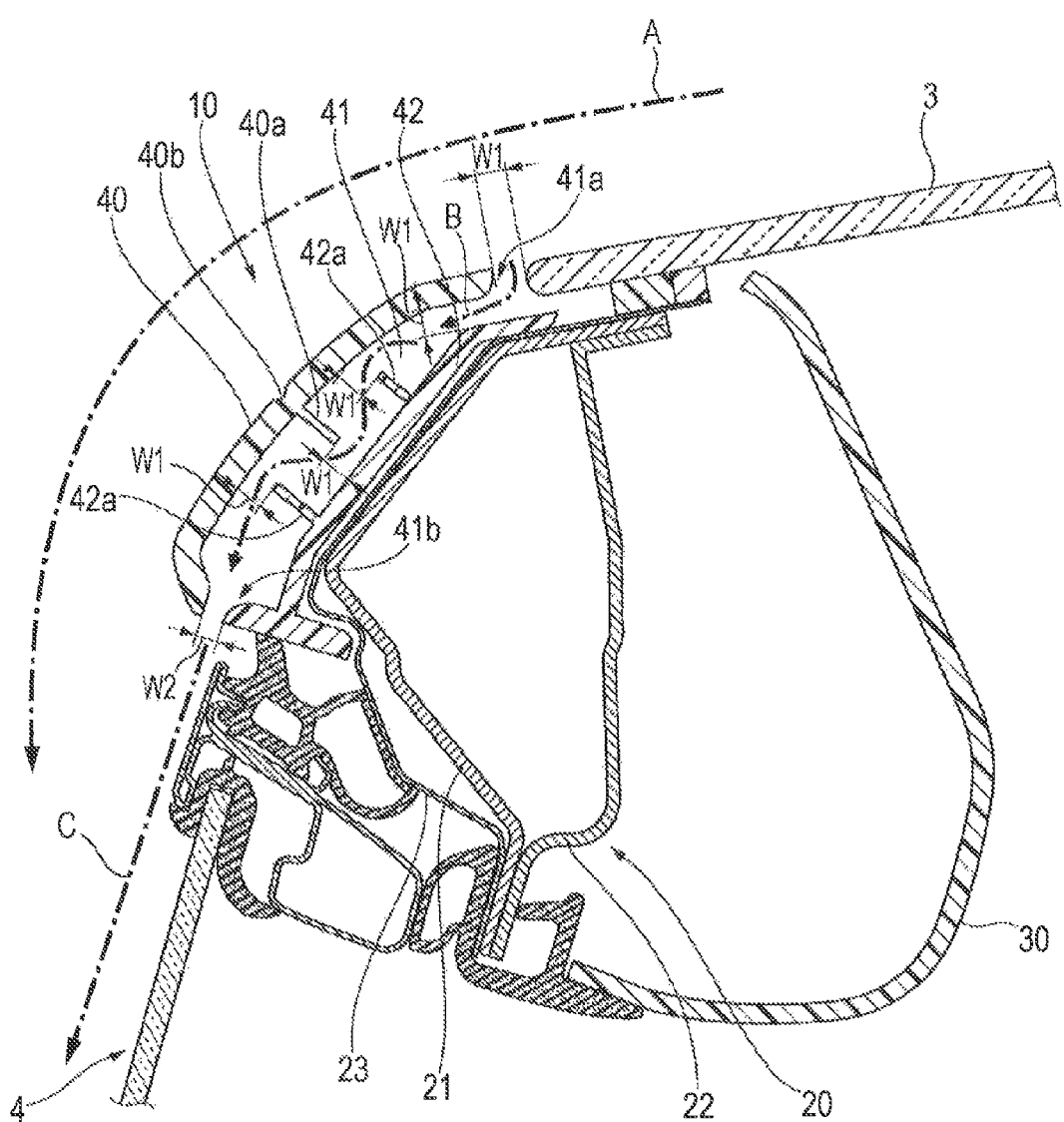
FIG. 2 is a cross-sectional view taken along line II-II of FIG. 1.

As illustrated in FIG. 2, the front pillar part 10 includes a front pillar 20, a pillar inner cover 30 disposed inwardly of the front pillar 20 in the vehicle cabin, and a pillar outer cover 40 disposed outwardly of the front pillar 20 in the vehicle cabin.

The front pillar 20 has a pillar reinforcement panel 21, a pillar inner panel 22 disposed inwardly of the pillar reinforcement panel 21, and a pillar outer panel 23 disposed outwardly of the pillar reinforcement panel 21. The intensity of the front pillar 20 is maintained by integrating these members 21, 22, and 23.

The pillar inner cover 30 is composed of, for instance, synthetic resin and covers the front pillar 20 from the inside of the vehicle cabin.

The pillar outer cover 40 is a member which is composed of, for instance, synthetic resin and covers the front pillar 20 located between the windshield 3 and the front door 4 from the outside. In addition, the outer surface of the pillar outer cover 40 near the windshield 3 is formed to have substantially the same height as the outer surface of the part of the windshield 3, the outer surface being adjacent to the pillar outer cover 40. A flow passage formation plate 42 for forming a flow passage 41 between the pillar outer cover 40 and the front pillar 20 is provided therebetween along the outer surface of the pillar outer panel 23, the flow passage 41 allowing the air or rain water, which flows over the outer surface of the windshield 3, to be flown through during running of the vehicle 1. Here, "the outer surface of the pillar outer cover 40 near the windshield 3 is formed to have approximately the same height as the outer surface of the part of the windshield 3, the outer surface being adjacent to the pillar outer cover 40" includes not only the case of exactly the same height, but also the case of 2 to 3 mm of difference of height.

Figure 3:
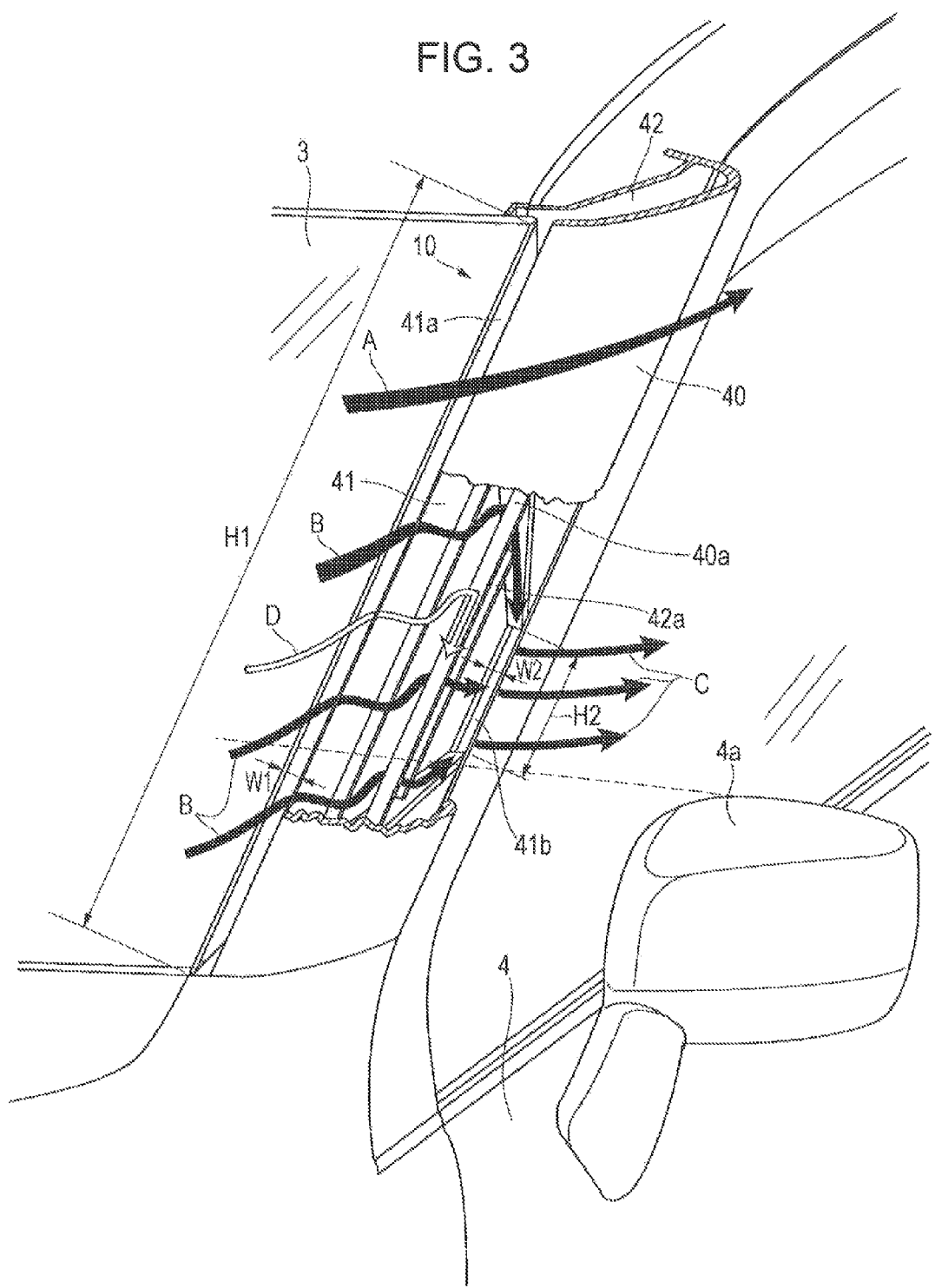
FIG. 3 is an internal perspective view of a front pillar.
Figure 4:
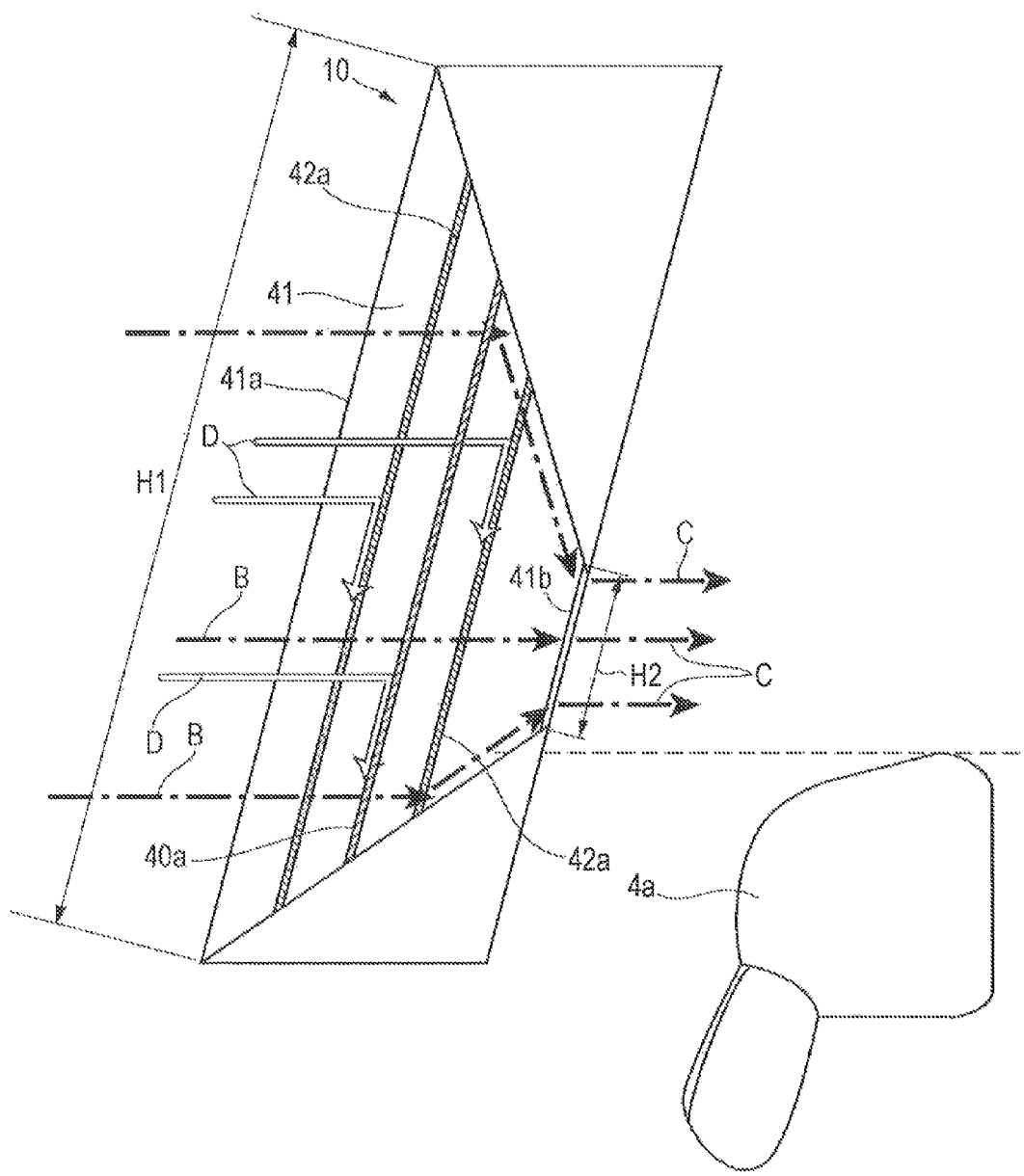
FIG. 4 is a cross-sectional view of a side of a front pillar, the cross-sectional view illustrating a positional relationship with a door mirror.

As illustrated in FIGS. 2, 3, and 4, the inner surface of the pillar outer cover 40 is provided with at least one rib 40a which projects toward the flow passage formation plate 42 and extends in the longitudinal direction of the pillar outer cover 40. The flow passage formation plate 42 is provided with at least one rib 42a which projects toward the pillar outer cover 40 and extends in the longitudinal direction of the flow passage formation plate 42. Thus, the flow passage 41 is formed so as to extend meandering from the windshield 3 to the front door 4 due to the ribs 40a and 42a.

The flow passage 41 includes an inlet port 41a for receiving air or rain water which flows over the outer surface of the windshield 3, an air outlet port 41b for discharging air separated from the rain water which has flown into the flow passage 41, and a water drain port (not illustrated) for draining the rain water which has flown into the flow passage 41 and has been separated from the air.

The inlet port 41a is open frontward between the windshield 3 and the pillar outer cover 40 and the dimension of the space between the windshield 3 and the pillar outer cover 40 is formed to have a predetermined width dimension W1. In addition, a dimension H1 of the inlet port 41a in the longitudinal direction is set to be substantially the same as the dimension of the pillar outer cover 40 in the longitudinal direction.

The air outlet port 41b is open toward the rear of the vehicle at a position which is in the vicinity of the front door 4 and is slightly higher than the height of the upper edge of the door mirror 4a. The upper edge of the door mirror 4a, which is provided at a position in the vicinity of the lower end of the front pillar part 10, is located at a position slightly lower than the middle of the pillar outer cover 40 in the vertical direction. The dimension of the space between the pillar outer cover 40 and the flow passage formation plate 42, i.e., the width dimension of the air outlet port 41b is set to be a predetermined width dimension W2 which is less than the width dimension W1 of the inlet port 41a. In addition, a dimension H2 of the air outlet port 41b in the longitudinal direction is considerably smaller than the dimension H1 of the pillar outer cover 40 in the longitudinal direction. In the this example, the dimension H2 of the air outlet port 41b in the longitudinal direction is set to be approximately one-fifth of the dimension H1 of the pillar outer cover 40 in the longitudinal direction.

The upper surface and the lower surface of the flow passage 41 are each formed with a plate-shaped member which extends from the inner surface of the pillar outer cover 40 to the flow passage formation plate 42 so as to introduce air from the inlet port 41a to the air outlet port 41b. The upper surface is inclined downward from the upper end of the inlet port 41a to the upper end of the air outlet port 41b, and the lower surface is inclined upward from the lower end of the inlet port 41a to the lower end of the air outlet port 41b. Thus, the flow passage 41 is formed such that the dimension thereof in the longitudinal direction gradually decreases as the flow passage 41 proceeds from the windshield 3 to the front door 4.

In the front pillar structure configured in the above manner, as illustrated by the arrow A in FIG. 2, most of air on both widthwise sides of the windshield 3 of the vehicle 1 during running flows along the outer surface of the pillar outer cover 40 and flows rearward of the vehicle 1. On the other hand, part of the air flows into the flow passage 41 from the inlet port 41a as illustrated by the arrow B in FIG. 2, and flows rearward of the vehicle 1 through the air outlet port 41b as illustrated by the arrow C.

In the above process, the air, which has flowed into the flow passage 41 through the inlet port 41a from both widthwise sides of the windshield 3 of the running vehicle 1, flows to the air outlet port 41b in a meandering path due to ribs 40a and 42a, and is discharged outside through an area which is slightly higher than the upper edge of the door mirror 4a. The width dimension W2 of the air outlet port 41b is formed to be smaller than W1 which is the width dimension of the inlet port 41a as well as the width dimension within the flow passage 41 limited by the ribs 40a and 42a. Furthermore, the dimension H2 of the air outlet port 41b in the longitudinal direction is set to be approximately one-fifth of the dimension H1 of the inlet port 41a in the longitudinal direction, and thus the velocity of the air which is discharged from the air outlet port 41b becomes higher than the velocity of the air which flows into the inlet port 41a. As a result, the air (arrow C) which flows rearward of the vehicle 1 through the flow passage 41 has a higher velocity than the air (arrow A) which flows rearward of the vehicle 1 along the outer surface of the pillar outer cover 40.

When the vehicle 1 is running, the vicinity of the upper edge of the door mirror 4a tends to have a negative pressure because air flows rearwardly against the front side of the door mirror 4a, and the negative pressure is a factor which reduces the aerodynamic performance of the vehicle 1. However, the air, which has been discharged rearwardly through a position slightly higher than the upper edge of the door mirror 4a, flows through a negative pressure region in the vicinity of the upper edge of the door mirror 4a, and thus the negative pressure can be reduced, thereby improving the aerodynamic performance.

Rain water adhering to the windshield 3 is wiped away by the wiper 3a while the vehicle 1 is running in the rain, and part of the rain water flows to both widthwise sides of the windshield 3. In the above process, the rain water along with air on both widthwise sides of the windshield 3 flow into the flow passage 41 through the inlet port 41a which is provided between the windshield 3 and the pillar outer cover 40. The rain water, which has flowed into the flow passage 41, comes into contact with the ribs 40a and 42a and adheres to the ribs 40a and 42a, and thus is separated from the air that has flowed into the flow passage 41. The rain water which has adhered to the ribs 40a and 42a, and has been separated from the air, flows downward along the ribs 40a and 42a as illustrated by arrow D, and is discharged outside through the water drain port provided at the lower end of the front pillar 20. Thus, the rain water separated from air in the flow passage 41 does not flow along the glass of the front door 4. In addition, the rain water which flows rearward of the vehicle 1 along the outer surface of the pillar outer cover 40, and the rain water which comes from both sides of the vehicle 1 can be flown rearward by merging with air before coming into contact with the glass of the front door 4, the air (arrow C) being discharged rearward through the air outlet port 41b at a high velocity. Consequently, reduction of visibility due to rain water through the lateral sides of the vehicle cabin during running of the vehicle 1 in the rain can be prevented.

When the vehicle 1 is running in the snow, snow adhering to the windshield 3 is wiped away by the wiper 3a, and part of the snow moves to both widthwise sides of the windshield 3. In the above process, the outer surface of the pillar outer cover 40 has substantially the same height as the outer surface of the part of the windshield 3 that is adjacent to the pillar outer cover 40, and thus snow does not stay on both widthwise sides of the windshield 3, and can be dropped on the lateral sides of the vehicle 1.

In this manner, with the front pillar structure of a vehicle of this example, the flow passage 41 is provided between the front pillar 20 and the pillar outer cover 40, the flow passage 41 allowing air and rain water, which flows over the outer surface of the windshield 3 due to running of the vehicle 1, to be flown through. The flow passage 41 is provided with the ribs 40a and 42a which extend in the longitudinal direction of the front pillar 20 configured to come into contact with rain water which has flown in so as to separate air and the rain water from each other. In addition, the air outlet port 41b for discharging the air which has flown through the flow passage 41 is formed at the rear end of the front pillar 20 at a position slightly higher than the upper edge of the door mirror 4a, the air outlet port 41b having a dimension smaller than the dimension of the inlet port 41a for allowing air to flow into the flow passage 41.

Thus, as described above, the negative pressure in the vicinity of the upper edge of the door mirror 4a can be reduced, thereby improving the aerodynamic performance, and it is possible to prevent reduction of visibility due to rain water through the lateral side of the vehicle cabin. The outer surface of the pillar outer cover 40 can be formed so as to have approximately the same height as the outer surface of the part of the windshield 3 that is adjacent to the pillar outer cover 40, and consequently, air resistance due to a step between the windshield and the pillar outer cover during running of the vehicle 1 can be reduced, deposition of snow on both widthwise sides of the windshield 3 during running of the vehicle 1 in the snow can be prevented, and the appearance of the vehicle 1 can be enhanced.

FIG. 5 illustrates another example of the present invention. FIG. 5 is a perspective view of the front pillar and its periphery for illustrating a flow passage which is formed between the front pillar 20 and the pillar outer cover 40. The same components as those in the previous example are denoted with the same reference symbols.

In this front pillar structure, an air outlet port 41d for discharging air to the outside is open rearwardly at the rear end of the front pillar 20 in the front-rear direction on the upper side of the front pillar 20 in the vertical direction, the air flowing through a flow passage 41c which is formed between the front pillar 20 and the pillar outer cover 40. A dimension H3 of the air outlet port 41d in the longitudinal direction is set to be approximately half the dimension of the front pillar 20 in the longitudinal direction. Accordingly, approximately the upper half of the rear end of the front pillar part 10 in the front-rear direction is open as the air outlet port 41d. In addition, the dimension of the air outlet port 41d in the longitudinal direction is set to be approximately half the dimension H1 of the inlet port 41a in the longitudinal direction. The lower surface thereof is inclined upward from the lower end of the inlet port 41a to the lower end of the air outlet port 41d. Thus, the flow passage 41c is formed such that the dimension thereof in the longitudinal direction is gradually reduced as the flow passage 41c proceeds from the windshield 3 to the front door 4. Consequently, the air, which flows through the flow passage 41c, is discharged rearwardly through the rear end of the upper side of the front pillar part 10 at an increased velocity.

Here, as illustrated in FIG. 1, the front pillar part 10 is disposed in an inclined position such that the upper side thereof is located rearward according to the geometry of the side ends of the windshield 3 and the front end of the front door 4. Therefore, the air, which flows from the front to the rear along the front surface of the windshield 3 and the front pillar part 10 during running of the vehicle 1, generates an air flow which moves in both left and right directions of the vehicle 1 upward from a lower position. The air flow becomes what is called a turbulent flow with a longitudinal vortex in the vicinity of the rear of the upper side of the front pillar part 10, and the turbulent flow is likely to generate a negative pressure which reduces the aerodynamic performance of the vehicle 1. However, the air flow in the vicinity of the rear of the upper side of the front pillar part 10 can be rectified by the air discharged from the rear end of the upper side of the front pillar part 10 so as to reduce the negative pressure, thereby contributing to the improvement of the aerodynamic performance of the vehicle 1.

In the above-described examples, the air, which flows through the flow passage 41 for the flow passage 41c), is discharged rearwardly of the vehicle 1 through the air outlet port 41b for the air outlet port 41d), the air outlet port 41b being formed at the rear of the front pillar part 10 in the front-rear direction at a position slightly higher than the height of the upper edge of the door mirror 4a, the air outlet port 41d being formed at the rear of the front pillar part 10 in the front-rear direction on the upper side of the front pillar part 10 in the vertical direction. However, the present invention is not limited to this configuration. An air outlet port may be provided in the vicinity of another location where a turbulent airflow is generated during running of the vehicle 1, so that the air, which flows through the flow passage 41, may be discharged through the air outlet port. Even in this case, turbulence of the airflow can be reduced by the discharged air so as to decrease the negative pressure, and thus the aerodynamic performance of the vehicle 1 can be improved.

In the above-described examples, each of the ribs 40a and 42a provided in the flow passage 41 serve as the gas-liquid separator. However, the present invention is not limited to this. Rain water may be absorbed, for instance, by using a member composed of a hygroscopic material, a net may be stretched over the flow passage 41 so as to allow water to adhere thereto, or air and rain water may be separated from each other by a membrane which is air permeable but water impermeable. In the examples, the inner surface of the pillar outer cover 40 is provided with a piece of the rib 40a and the flow passage formation plate 42 is provided with two pieces of the rib 42a. However, the present invention is not limited to this configuration. For example, one of the pillar outer cover 40 and the flow passage formation plate 42 may be provided with one rib, or both of the pillar outer cover 40 and the flow passage formation plate 42 may be provided a plurality of ribs.

In this example, the flow passage formation plate 42 for forming the flow passage 41 is provided between the pillar outer cover 40 and the front pillar 20. However, the present invention is not limited to this configuration. A flow passage may be formed between the pillar outer cover 40 and the front pillar 20 without using the flow passage formation plate 42. In this case, an effect similar to the aforementioned effect may be obtained by directly forming a rib in the front pillar 20. Alternatively, the outer surface of the front pillar 20 may be covered by a pillar outer cover which is formed in a hollow shape. In this case, an effect similar to the aforementioned effect may also be obtained by forming a flow passage provided with a rib inside the hollow pillar outer cover.

The invention claimed is:

1. A front pillar structure for a vehicle, the structure comprising:
    a windshield disposed on the front of a vehicle body;
    a front door disposed at a widthwise side of the vehicle body;
    a front pillar located between the windshield and the front door;
    a pillar outer cover disposed on an outer surface of the front pillar;
    a side mirror disposed on a front side of the front door in a front-rear direction;
    an inlet port disposed between the front pillar and the pillar outer cover, the inlet port being disposed on a front side in the front-rear direction and configured to allow air therethrough;
    an outlet port disposed between the front pillar and the pillar outer cover, the outlet port being disposed on a rear side in the front-rear direction and extending a predetermined range above a height of an upper edge of the side mirror, and being configured to discharge air therethrough; and
    a gas-liquid separator disposed between the front pillar and the pillar outer cover, the gas-liquid separator being configured to separate water from air, the water flowing into the inlet port with the air, to guide the air after the separation to the outlet port, and to introduce the water after the separation to a lower side in a vertical direction of the vehicle,
    wherein a vertical dimension of the outlet port is smaller than a vertical dimension of the pillar outer cover.

2. A front pillar structure for a vehicle, the structure comprising:
    a windshield disposed on a front side of a vehicle body;
    a front door disposed at a widthwise side of the vehicle body;
    a front pillar disposed between the windshield and the front door;
    a pillar outer cover disposed on an outer surface of the front pillar;
    an inlet port disposed between the front pillar and the pillar outer cover, the inlet port being disposed on a front side in the front-rear direction and configured to allow air to flow therethrough;
    an outlet port disposed between the front pillar and the pillar outer cover, the outlet port being disposed on a rear side in the fore-and-aft direction and overlapping, at least in part, with an upper half of the front pillar, and configured to discharge air therethrough; and
    a gas-liquid separator disposed between the front pillar and the pillar outer cover, the gas-liquid separator being configured to separate water from air, the water flowing into the inlet port with the air, to guide the air after the separation to the outlet port, and to introduce the water after the separation to a lower side in a vertical direction of the vehicle,
    wherein a vertical dimension of the outlet port is smaller than a vertical dimension of the pillar outer cover.

3. The front pillar structure according to claim 1, wherein the pillar outer cover is a separate component from a housing of the side mirror.

4. The front pillar structure according to claim 1, wherein the vertical dimension of the outlet port is smaller than a vertical dimension of the inlet port.

5. The front pillar structure according to claim 1, wherein the gas-liquid separator is disposed within a flow passage extending between the inlet port and the outlet port, the flow passage gradually decreasing between the inlet port and the outlet port.

6. The front pillar structure according to claim 5, wherein the flow passage gradually decreases due to the inclusion of at least one of: an upper surface that is inclined between an upper end of the inlet port and an upper end of the outlet port; and a lower surface that is inclined between a lower end of the inlet port and a lower end of the outlet port.

7. The front pillar structure according to claim 2, further comprising
    a side mirror disposed on a front side of the front door in a front-rear direction,
    wherein the pillar outer cover is a separate component from a housing of the side mirror.

8. The front pillar structure according to claim 2, wherein the vertical dimension of the outlet port is smaller than a vertical dimension of the inlet port.

9. The front pillar structure according to claim 2, wherein the gas-liquid separator is disposed within a flow passage extending between the inlet port and the outlet port, the flow passage gradually decreasing between the inlet port and the outlet port.

10. The front pillar structure according to claim 9, wherein the flow passage gradually decreases due to the inclusion of at least one of: an upper surface that is inclined between an upper end of the inlet port and an upper end of the outlet port; and a lower surface that is inclined between a lower end of the inlet port and a lower end of the outlet port.

* * * * *